United States Patent
Bodine et al.

(10) Patent No.: US 6,799,005 B2
(45) Date of Patent: Sep. 28, 2004

(54) METHOD AND SYSTEM OF PRE-SELECTING ORDERED MEDIA IN A PRINTING SYSTEM

(75) Inventors: James E. Bodine, Rochester, NY (US); Thomas R. Hull, Spencerport, NY (US)

(73) Assignee: NexPress Digital LLC, Rochester, NY (US)

(*) Notice: Subject to any disclaimer, the term of this patent is extended or adjusted under 35 U.S.C. 154(b) by 0 days.

(21) Appl. No.: 10/236,627

(22) Filed: Sep. 5, 2002

(65) Prior Publication Data

US 2003/0044194 A1 Mar. 6, 2003

Related U.S. Application Data

(60) Provisional application No. 60/317,604, filed on Sep. 5, 2001.

(51) Int. Cl.[7] .................................................. G03G 15/00
(52) U.S. Cl. ....................................................... 399/82
(58) Field of Search ............................... 399/82, 83, 84

(56) References Cited

U.S. PATENT DOCUMENTS

| | | | | |
|---|---|---|---|---|
| 5,452,062 A | * | 9/1995 | Baldwin et al. | 399/82 |
| 5,655,207 A | * | 8/1997 | Sugiyama et al. | 399/382 |
| 6,571,072 B1 | * | 5/2003 | Sugimoto | 399/81 |
| 2002/0101607 A1 | | 8/2002 | Hull | 358/1.15 |
| 2002/0146256 A1 | * | 10/2002 | Sekiguchi et al. | 399/82 |
| 2003/0026626 A1 | * | 2/2003 | Sunada et al. | 399/82 |

FOREIGN PATENT DOCUMENTS

| | | |
|---|---|---|
| EP | 0 479 494 | 12/1997 |

OTHER PUBLICATIONS

"Network Imaging System Interface Development Guide, Release 2", Network Communications, Feb. 2000, Heidelberg Digital L.L.C., pp. i–iv, , 1–1 to 6–6, I–1 to I–7.

U.S. patent application Ser. No. 09/572,341, Hansen et al., filed May 17, 2000.

* cited by examiner

Primary Examiner—Quana Grainger

(57) ABSTRACT

A method of pre-selecting ordered media in a printing system. Ordered media, such as tabs, are pre-selected into a part for use in a print run and an unwanted part to be discarded. Pre-selecting the ordered media results in a more efficient processing of the print run because the unwanted part of the ordered media is absent and therefore not processed during the print run. Pre-selecting is performed through a user interface on the printing system.

11 Claims, 13 Drawing Sheets

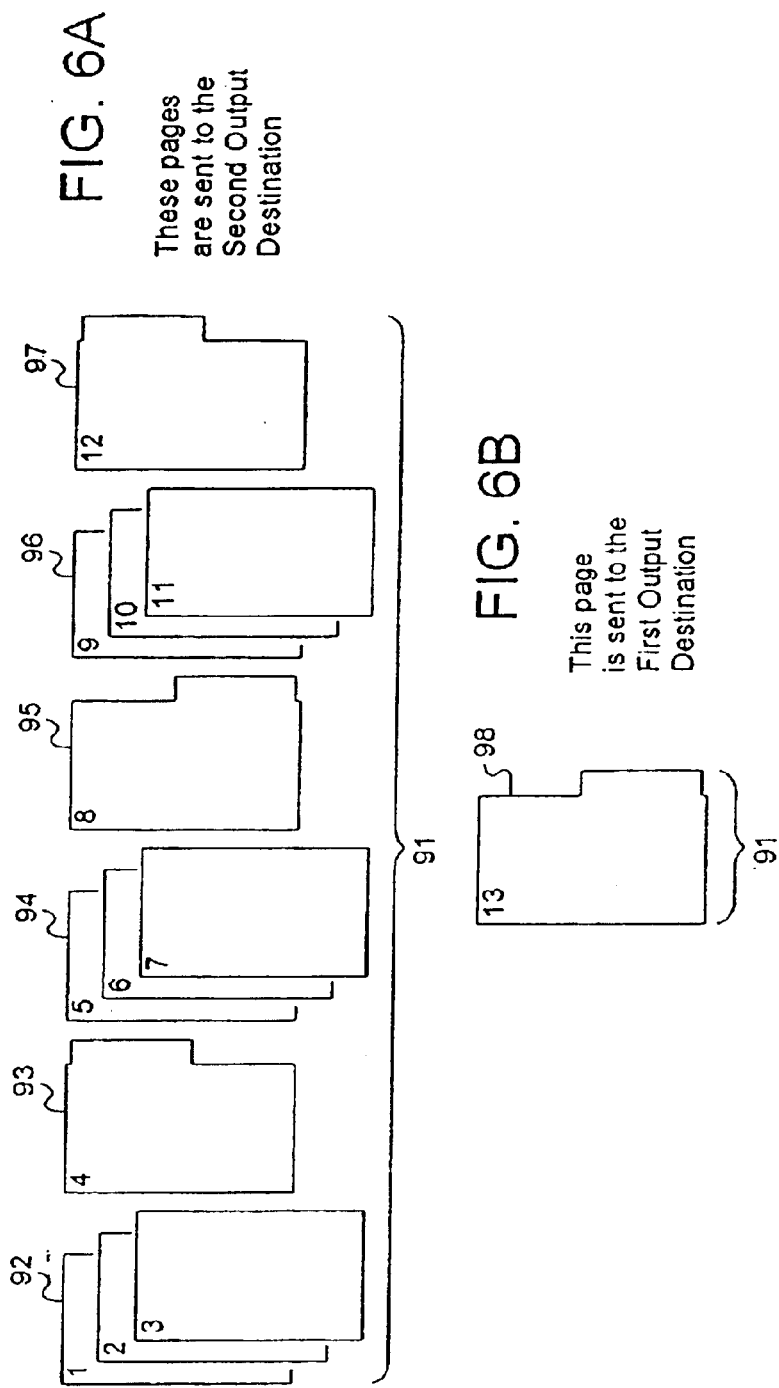

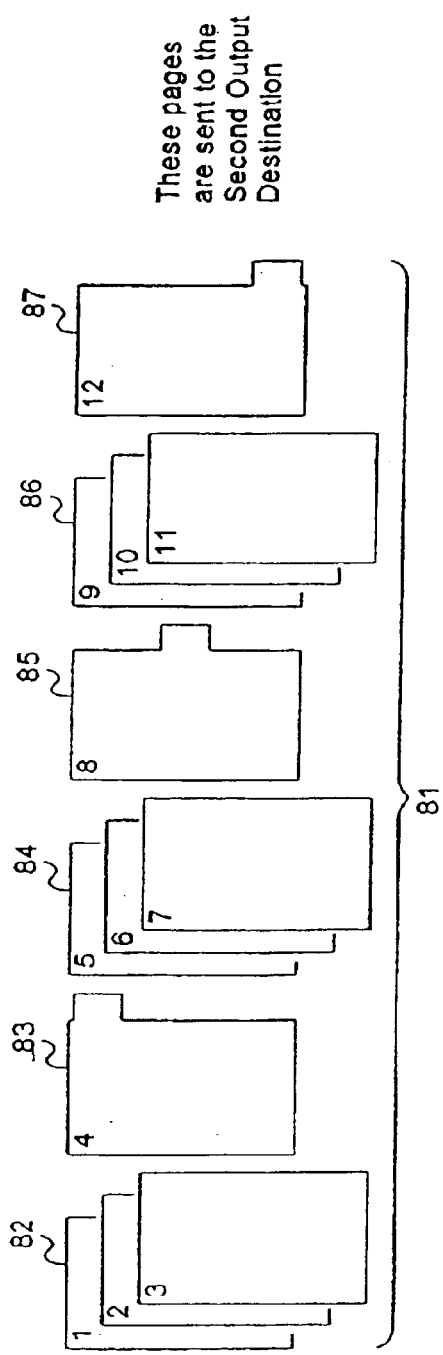
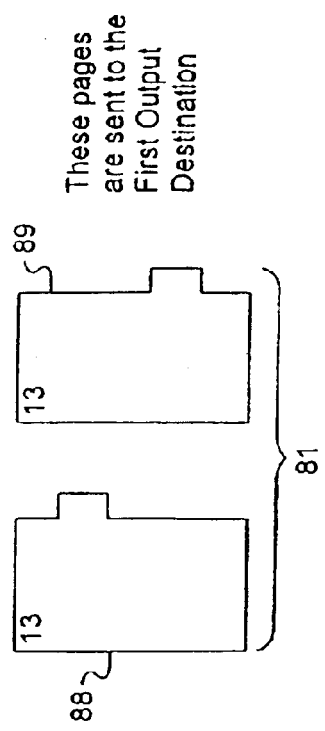
FIG. 7A
FIG. 7B

Table 2: Example of a Balanced MediaExit Pattern

| Page Identifier | Printed On? | Output Destination |
|---|---|---|
| 4 | True | Second Output Dest. |
| 8 | False | First Output Dest. |
| 8 | True | Second Output Dest. |
| 12 | False | First Output Dest. |
| 12 | True | Second Output Dest. |

FIG. 7C

Table 3: Example of an Unbalanced MediaExit Pattern

| Page Identifier | Printed On? | Output Destination |
|---|---|---|
| 4 | True | <JobExit> |
| 8 | True | <JobExit> |
| 12 | True | <JobExit> |
| last | False | Output Destination 1 |
| last | False | Output Destination 1 |

FIG. 7D

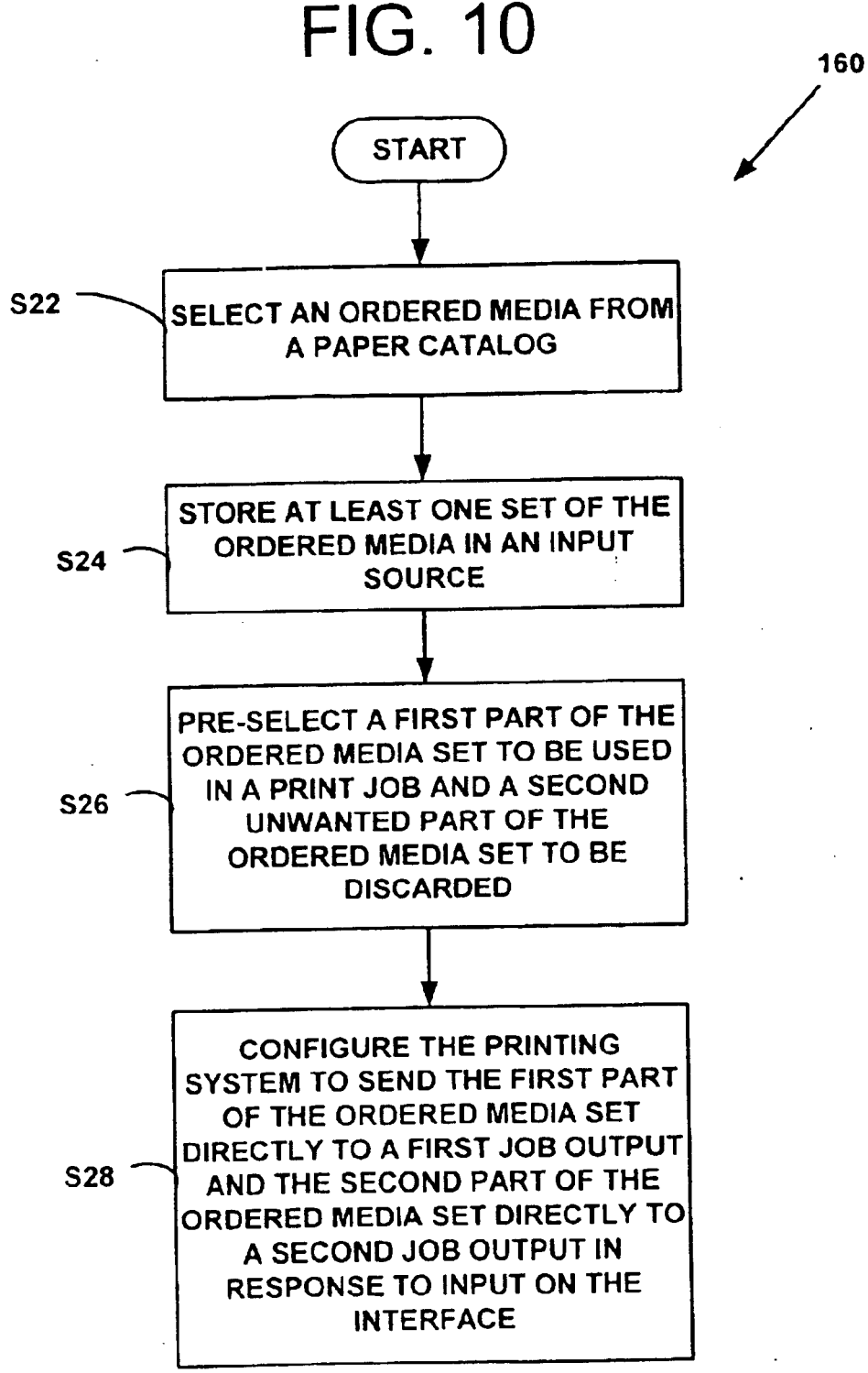

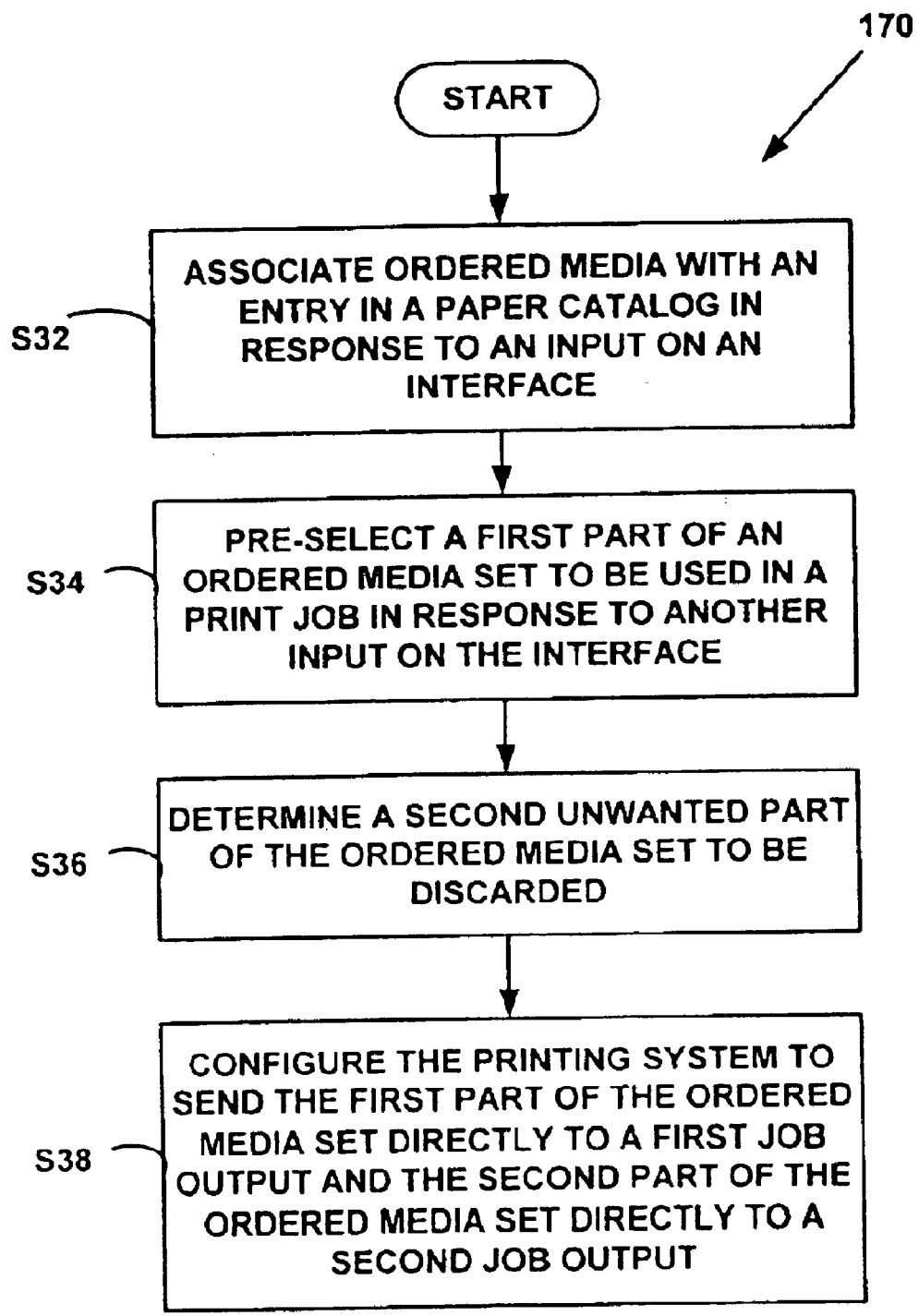

METHOD AND SYSTEM OF PRE-SELECTING ORDERED MEDIA IN A PRINTING SYSTEM

CROSS REFERENCE TO RELATED APPLICATIONS.

This application is based on Provisional Application 60/317,604 having the title "Method and System of Pre-selecting Ordered Media in a Printing System" filed on Sep. 5, 2001. The benefit of the filing date of the Provisional Application is claimed for this application.

FIELD OF THE INVENTION

This invention relates to digital printing. More specifically, this invention relates to a method and system of pre-selecting ordered media in a printing system.

BACKGROUND

A digital printing system with multiple media (e.g., paper) supplies and output destinations may have limited capability in the selection of different output destinations for the blank or printed output pages. For example, a digital printing system may only allow a user to select one output destination per output set for a print job. An output set refers to a group of output pages (e.g., printed output pages), which may be repeated for a single print job. Many digital printing systems generally fail to allow the operator to choose an output destination for individual pages of the output set. The user of the printing system may resort to inefficient, labor-intensive, and slow manual sorting processes to handle the proper grouping or collating of papers for a print job, where individual treatment of one or more output pages in the output set is required. Thus, a need exists for a printing system that supports selection of different output destinations, even for the same execution of a single output set of a print job to reduce printing costs and cycle time.

Some printing systems support special features that allow two output destinations to be used during a single print job. These printing systems typically use one exit (e.g., a top exit) for printing media of their system as a "purge" tray. For print jobs executed on such a printing system, the printing system determines if some of the media loaded in one of the input paper trays is not needed by a current or a successive print job, but must be fed through the system so that the next output set does not improperly use the wrong media. Accordingly, the printing system calculates how many unwanted sheets in the input paper tray must be "purged". However, the printing system may lack the flexibility to let a requestor choose when to route a page to the "purge" tray to customize a print job. Finally, many printing systems do not support printing on the pages which are sent to the "purge" tray, further detracting from the ability to tailor a printing job to meet the preferences of a user. Thus, a need exists to enhance a user's control over the routing of pages within a printer to support a customization of a print job.

When using ordered media within a print job, there may be instances where it is necessary to separate or dispose of unused portions or sheets of the ordered media. Separating the unused portions of the ordered media during the print job may slow down the completion of the print job. This may lead to inefficient use of printer when the print shop has many print jobs to run on the printer. Therefore, there is a need to pre-select only that portion of the ordered media that will be used in the print job.

SUMMARY

In order to address the deficiencies of the prior art, an improved method and system are provided for pre-selecting only that portion of the ordered media that will be used in the print job. As a result, the unused portion of the ordered media is not present when the print job is run, leading to a faster and more efficient processing of the print job on the printer.

In accordance with one aspect of the invention, a system is provided for pre-selecting ordered media in a printing system. The system includes an input source to store at least one set of the ordered media. The system also includes a user interface having an input device to select the ordered media from a paper catalog. The user interface is also used to pre-select a first part of the ordered media set to be used in a print job and a second unwanted part of the ordered media set to be discarded. The system further has a first job output, a second job output, and a central processing unit configured to send the first part of the ordered media set directly to the first job output and the second part of the ordered media set directly to the second job output.

Another aspect of the invention is a method of pre-selecting ordered media in a printing system. The method includes associating the ordered media with an entry in a paper catalog in response to an input on an interface. The method also includes pre-selecting a first part of a set of the ordered media to be used in a print job in response to another input on the interface. The method further includes determining a second unwanted part of the ordered media set to be discarded, and configuring the printing system to send the first part of the ordered media set directly to a first job output and the second part of the ordered media set directly to a second job output.

A further aspect of the invention is a method of pre-selecting ordered media in a printing system. The method includes selecting the ordered media from a paper catalog through an interface on the printing system. The ordered media comprises a plurality of sheets having different physical characteristics. The method also includes storing at least one set of the ordered media in an input source, and pre-selecting through an interface on the printing system a first part of the ordered media set to be used in a print job and a second unwanted part of the ordered media set to be discarded. The method further includes configuring the printing system to send the first part of the ordered media set directly to a first job output and the second part of the ordered media set directly to a second job output in response to input on the interface.

Yet another aspect of the invention is a system for pre-selecting ordered media in a printing system. The system includes means for associating the ordered media with an entry in a paper catalog in response to an input on an interface. The system also includes means for pre-selecting a first part of a set of the ordered media to be used in a print job in response to another input on the interface. The system further includes means for determining a second unwanted part of the ordered media set to be discarded, and means for configuring the printing system to send the first part of the ordered media set directly to a first job output and the second part of the ordered media set directly to a second job output.

The foregoing and other features and advantages of preferred embodiments of the present invention will be more readily apparent from the following detailed description, which proceeds with reference to the accompanying drawings.

BRIEF DESCRIPTION OF THE DRAWINGS

FIG. 6A and FIG. 6B are an example of an output set of the printing system of FIG. 2;

FIG. 6C is a chart of a media exit pattern for establishing the output set of FIG. 6A and FIG. 6B;

FIG. 7A and FIG. 7B are an example of output set of the printing system of FIG. 2;

FIG. 7C is a chart of a media exit pattern for establishing the output set of FIG. 7A and FIG. 7B;

FIG. 7D is a chart of an example of an unbalanced media exit pattern for the printing system of FIG. 2;

FIG. 10 is a flow chart for a preferred method of pre-selecting ordered media in the printing system of FIG. 2; and FIG. 11 is a flow diagram illustrating a preferred method for pre-selecting ordered media in a printing system of FIG. 2.

DETAILED DESCRIPTION OF THE PRESENTLY PREFERRED EMBODIMENTS

As used herein, a printing system shall refer to a digital printing system, a duplicating system, or both. This invention relates to a printing system that has at least one input source and preferably multiple input sources and at least one output destination. Further, where multiple input sources are present, each of the input sources may be loaded with different media (e.g., different types or sizes of paper). The printing system 26 may be capable of producing collated output sets of sheets, which are deposited in one or more of the output destinations.

Figure 1:
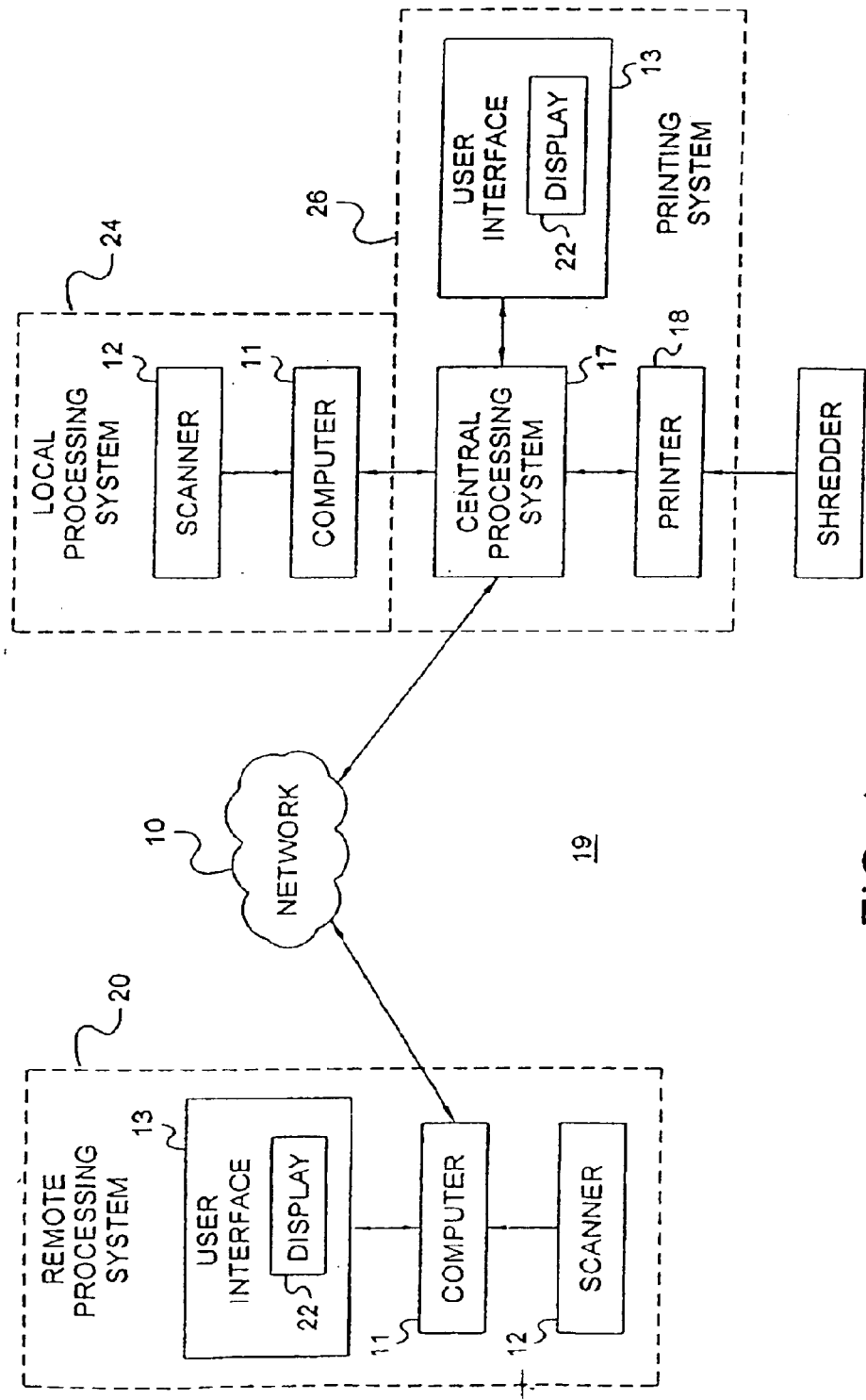
FIG. 1 is a block diagram of document production system.

FIG. 1 is a block diagram illustrating a document production system 19. The document production system 19 includes a remote processing system 20, a communications network 10, a local processing system 24, and a printing system 26. The remote processing system 20 may communicate with the printing system 26 over the communications network 10. The local processing system 24 may communicate directly with the printing system 26.

The document production system 19 facilitates the conversion of a physical representation (e.g., printed page) of an input image to an electronic representation at the local processing system 24 or at the remote processing system 20. The document production system 19 facilitates the transfer of an electronic representation of one or more input images from a remote processing system 20 to the printing system 26 over the communications network 10. The printing system 26 processes the electronic representation in a manner that supports page-by-page routing of output pages to one or more output destinations of the printer 18.

The remote processing system 20 includes a user interface 13 coupled to a computer 11. In turn, the computer 11 is coupled to a scanner 12. In one embodiment, the user interface 13 refers to a graphical user interface that includes a keyboard, a pointing device (e.g., mouse), a display 22, and attendant software instructions to support the keyboard, the pointing device, and the display 22. The computer 11 may represent a source or receptor of one or more print jobs for the printing system 26. For example, the computer 11 may support a print job derived from the operation of the scanner 12. The computer 11 may transmit the print jobs, including electronic representations of input images or documents, to the printing system 26 via the communications network 10. The communications network 10 may refer to the Internet, an intranet, a circuit-switched network, a data packet network, an ethernet system, or any other suitable communications network.

The local processing system 24 includes a scanner 12 coupled to a computer 11. In turn, the computer 11 manages communications with a central processing unit ("CPU") 17 of the printing system 26. The local processing system 24 may represent a source or receptor of one or more print jobs to the printing system 26.

The remote processing system 20 or the local processing system 24 can create electronic representations of input pages for execution by the printing system 26. The scanner 12 supports scanning of input images on pages and producing an electronic representation of the input images for printing on the printing system 26.

The printing system 26 includes a CPU 17 that is coupled to a user interface 13 and a printer 18. The user interface 13 includes a display 22. The CPU 17 refers to a computer or data processing system, which accepts print jobs via the communications network 10 or otherwise. For example, the print jobs may come from the remote processing system 20, the local processing system 24, or both.

The CPU 17 controls many or all aspects of printing one or more print jobs on the printer 18. The CPU 17 may be physically implemented using one or more data processors, in a conventional or parallel computing architecture to control the printing process. The CPU 17 may determine a pattern of media feeds for each output set of a print job to achieve a desired appearance characteristic of sheets of an output set. The desired appearance characteristic may include scaling of an image, resolution of an image, contrast of an image, darkness or intensity of an image, the order of sheets in an output set, the selection of media for different sheets in an output set, stapling of sheets in an output set, binding of an output set, holes in media of the output set, or other attributes that affect the visual appearance or presentation of a print job.

The printing system 26 may maintain data bits at memory locations in its respective memory systems to reconfigure or otherwise alter the CPU's 17 operation, as well as other processing of signals. The memory locations, such as random access memory ("RAM"), are physical locations that have particular electrical, magnetic, or optical properties corresponding to the data bits, depending on the type of memory used. The local processing system 24 and remote processing system 20 also include respective central processing units (not shown) in their computers 11, and also include respective memory systems (not shown).

The data bits may also be maintained on a computer readable medium including magnetic disks, optical disks, and any other volatile or non-volatile mass storage system readable by the CPU 17 of the printing system 26 or by the computers 11 within the local processing system 24 and remote processing system 20. The computer readable medium includes cooperating or interconnected computer readable media that exist exclusively on the printing system 26 or are distributed among multiple interconnected processing systems such as the local processing system 24 or the remote processing system 20.

The user interface 13 supports a user's selection of features of the printing system 26 or preferences in the ultimate presentation of the output set or print job produced by the printing system 26. Upon receiving a print job at the CPU 17, a user of the printing system 26 uses the user interface 13 to check the status of the print job or jobs. Further, the user may use the user interface 13 to determine how the print jobs are set up. The display 22 of the user interface 13 may have separate screens dedicated to corresponding functions such as displaying the status of the print job and structuring the setup of the print jobs. A screen represents an image that is displayed on the display 22 of the user interface 13.

Figure 2:
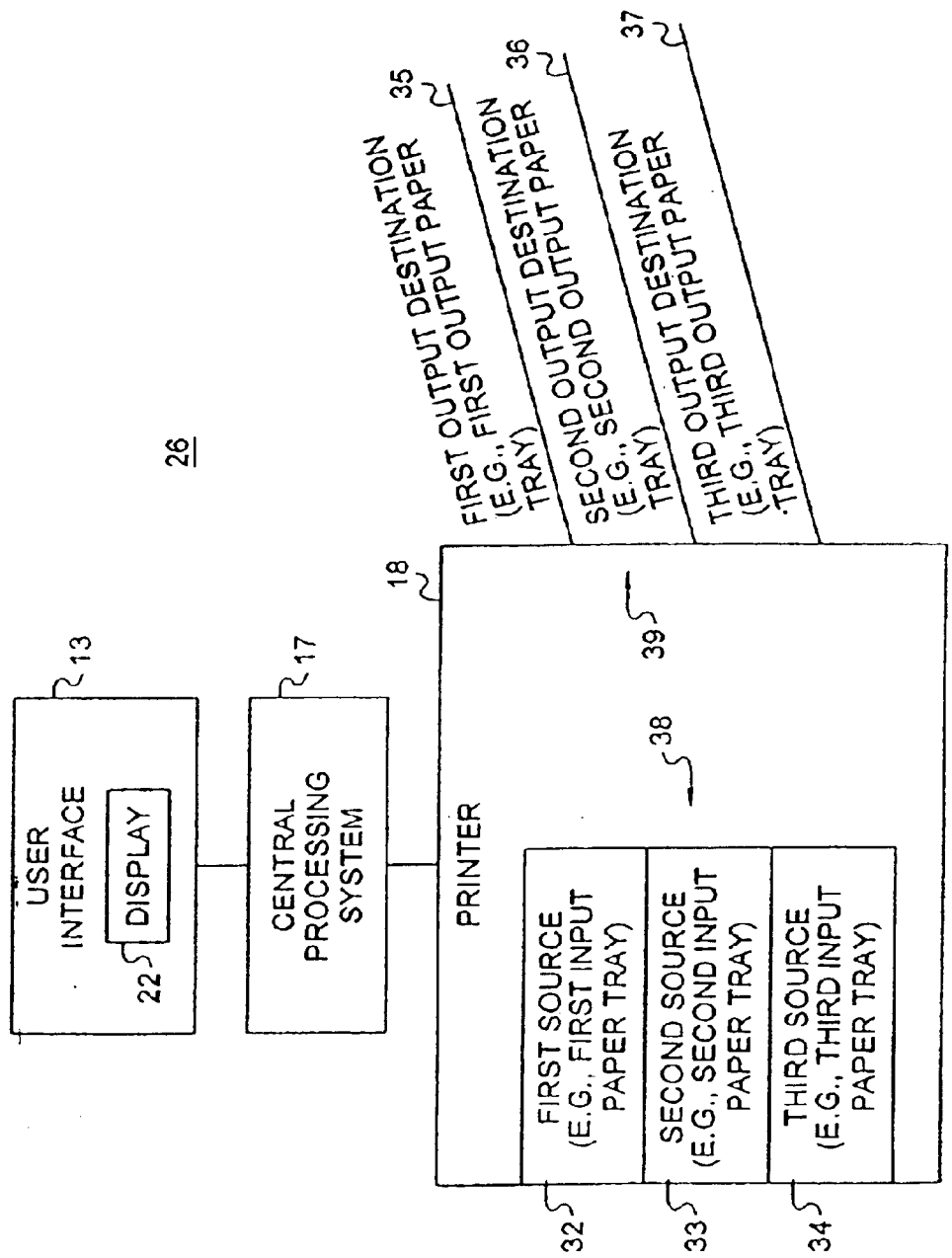
FIG. 2 is a diagram of a printing system with multiple input sources and output destinations.

An additional screen allows the operator to view the attributes of the media loaded in the input sources, which are shown in FIG. 2. Another additional screen provides the display of jam recovery instructions so that the user is notified of jam recovery instructions or instantaneous feedback on corrective measures that the user has applied to the printer 18.

FIG. 2 is a block diagram illustrating a printing system 26 which has multiple input sources 38 and multiple output destinations 39. Like reference numbers in FIG. 1 and FIG. 2 indicate like elements. Although three input sources 38 and three output destinations 39 are shown, in other embodiments that fall within the scope of the invention, the printing system 26 may have as few as one input source and one output source. As shown in FIG. 2, the input sources 38 include a first input source 32, a second input source 33, and a third input source 34. The output destinations 39 include a first output destination 35, a second output destination 36, and a third output destination 37.

The input sources 38 may represent several different alternative structures. In accordance with a first alternative, the input sources 38 may include print trays for holding an assortment of different types of media (e.g., paper). When the printer 18 is in operation, the media in the print trays passes through the printer 18 and may receive an image that is printed by a print engine (not shown). In accordance with a second alternative, the input sources 38 may include inserters that hold another assortment of different types of media for passage through the printer 18 without printing on them. Media from the inserters may take an alternate paper path through the printer 18 that does not go through the print engine. Examples of inserted media include media that do not require an image from the printer 18, such as completed photographic inserts, ordered media (e.g., tabs) and section dividers.

The output destinations 39 may represent several different alternative structures. In accordance with a first alternative, the output destinations 39 may be trays for holding assortments of different types of media. In accordance with a second alternative, the output destinations 39 may represent different finishing devices for application to one or more pages after the printing or the passage of the pages through the printer 18 without printing on them. Finishing devices may include a stapler, a stacker, a folder, a binder, or another processing station for processing media sent to the output destination. For example, the first output destination 35 may be associated with a stapler that staples groups of paper, the second output destination 36 may be associated with a stacker that stacks paper in sequential order, and the third output destination 37 may be associated with a folder that folds paper to facilitate selective processing of the output pages of an output set of a print job.

Figure 3:
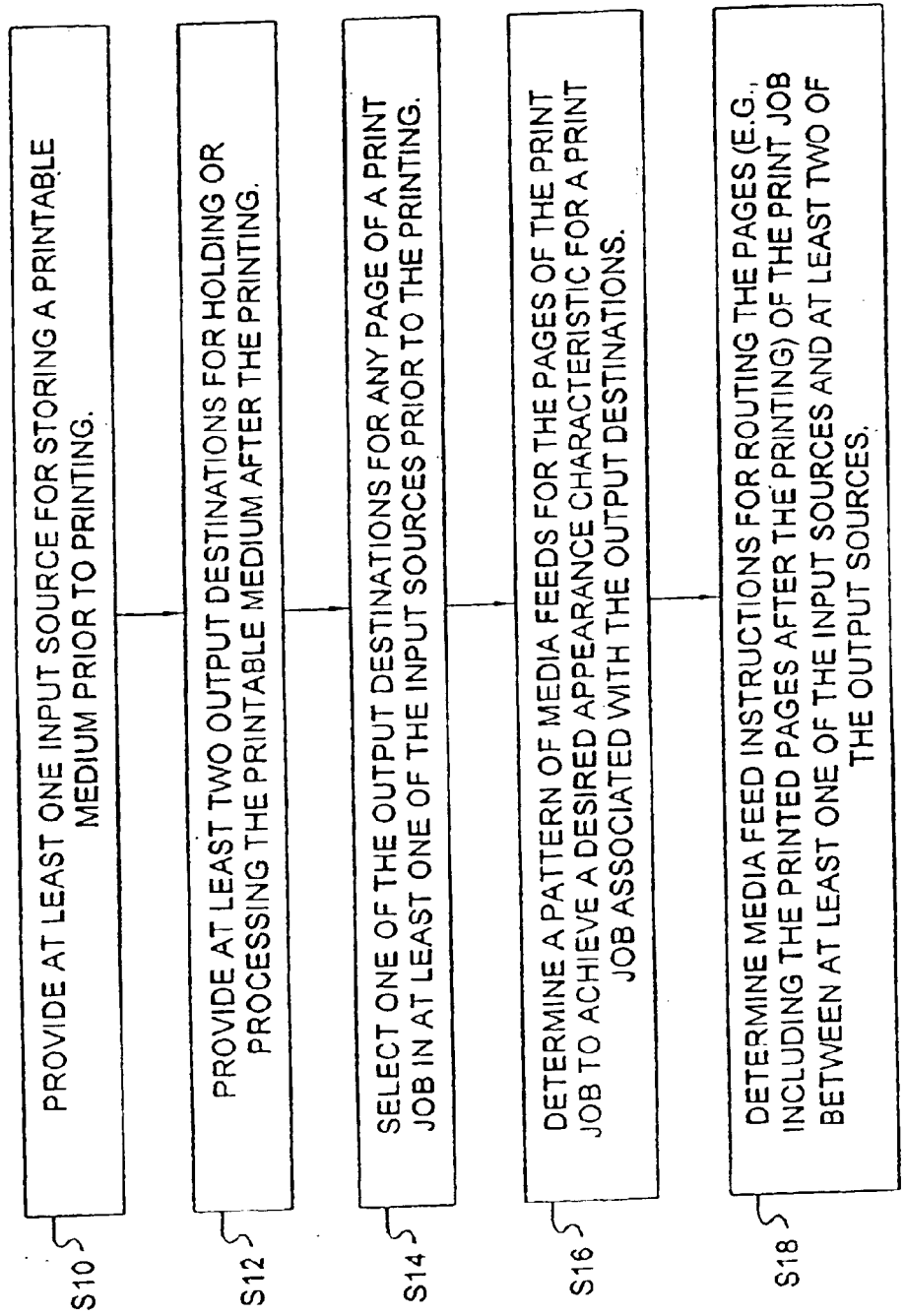
FIG. 3 is a flow chart illustrating a preferred method for directing input pages to one or more selected output destinations of the printing system of FIG. 2.

FIG. 3 is a flow diagram illustrating a method for directing input pages to one or more selected output destinations of a printer 18. The method of FIG. 3 starts in step S10.

In step S10, the printing system 26 provides at least one input source 38 (e.g., first input source 32) for storing a medium prior to printing or otherwise operating on the medium. The printable medium may represent paper, a polymeric film, a transparency, a photographic quality paper, a cloth sheet, or any other medium suitable for printing.

In step S12, which may occur before, after, or simultaneously with step S10, the printing system 26 provides one or more output destinations 39 for holding or processing the medium after the printing or passage through the printer 18 without printing. In one example, the output destinations 39 comprise paper trays for holding or processing the medium. One such paper tray is known to those of ordinary skill in the art as a "top exit," which may collect media that is discarded by the print job. In another example, the output destinations comprise processing or finishing stations for stapling, binding, folding, or sorting one or more output pages of a print job.

In step S14, the user interface 13 supports the selection of one of the output destinations 39 for any page of a print job in at least one of the input sources 38 prior to the printing. The CPU 17 stores a print job identifier and page identifiers (e.g., page numbers) associated with the print job identifier. For each page identifier in the print job, the CPU 17 may assign a particular input source 38 to select a desired input medium and an output destination 39. The selection of the output destination 39 may support customized processing of an individual page, such as post-printing processing.

In step S16, the CPU 17 determines a pattern of media feeds for the page identifiers or pages of the print job to achieve a desired appearance characteristic or assembled characteristic for a print job associated with the output destinations 39. The CPU 17 may organize a print job into a table or database that defines the pattern of media feeds by using one or more of the following fields: job identifier, page identifier, input source, and output destination. Further, the CPU 17 may have a printing indicator field in the table or database. The printing indicator expresses whether a printer 18 is supposed to print on a particular page (with a designated page identifier) or leave the particular page blank prior to or while directing the page to the output destination.

In step S18, the CPU 17 determines media feed instructions for routing the pages (e.g., including the printed pages after the printing) of the print job between at least one of the input sources and at least one of the output sources. The CPU 17 converts the information in the table or database into printer-readable language or instructions for controlling the printing operation and the direction of pages from the at least one input source 38 to one or more output destination sources 39.

Figure 4:
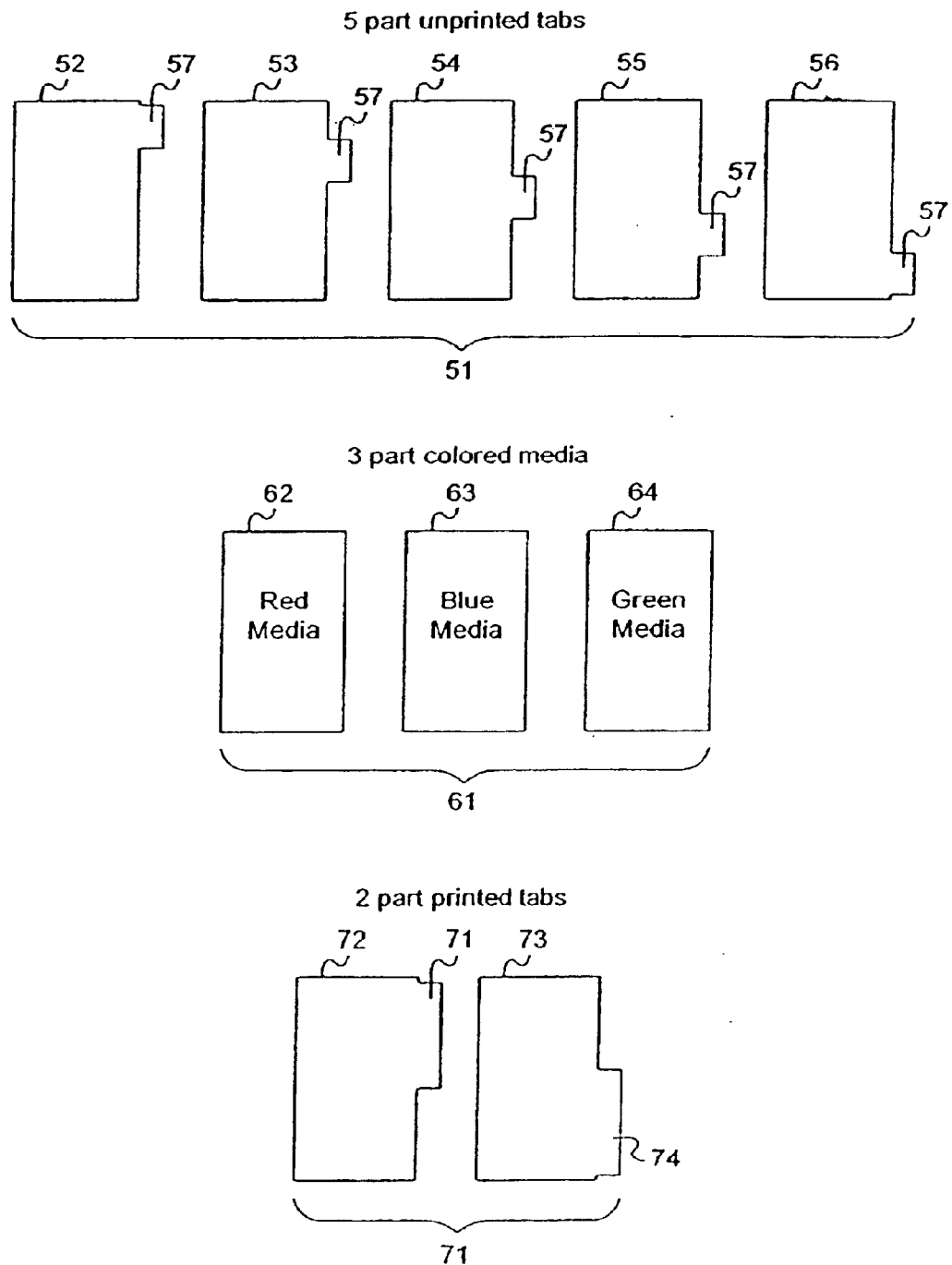
FIG. 4 is an example of different input media with a repeating collated sequence.

FIG. 4 shows several examples of groups (51, 61, and 71) of sequentially ordered pages for placement in the input source 38 of the printing system 26. A first group 51 of sequentially ordered pages includes tabs 57 that vary in position on each sequential page. Although the first group 51 includes a first page 52, a second page 53, a third page 54, a fourth page 55, and a fifth page 56, an alternate embodiment may use more or less pages for the first group 51. A second group 61 of sequentially ordered pages includes differently colored pages. Although the second group 61 includes a red page 62, a blue page 63, and a green page 64, other colors of pages for the second group 61 fall within the scope of the invention. A third group 71 of sequential ordered pages includes pages with at least two different tab positions 74. The tabs of the third group 71 may have printing on them even when they are first placed in the input source 38. Although the third group 71 includes a first page 72 and a second page 73, the number of pages may be generally commensurate with the number of tab positions in an alternate embodiment. Any of the foregoing input sources 38 may hold letter paper or some other medium instead of the aforementioned media A user of the printer 18 may load the first group 51, the second group 61, or the third group 71 into corresponding ones of the input sources 38. For example, the user may load repetitive sets of the first group 51 into the first input source 32, repetitive sets of the second group 61 into the second input source 33, and repetitive sets of the third group 71 into the third input source 34. The user enters a selection of the input sources 38 or a selection of a particular medium or arrangement of media associated with an input source 38 prior to printing on or otherwise processing the pages in the input sources 38 for a print job.

In general, FIG. 5A through FIG. 5D illustrate various screens that may be displayed on the user interface 13 of the remote processing system 20, the printing system 26, or both. A screen is an image on the display 22 that supports user interaction with the printing system 26. A screen may be displayed on the display 22 to enable a user to control various aspects of the printing system 26.

Figure 5A:
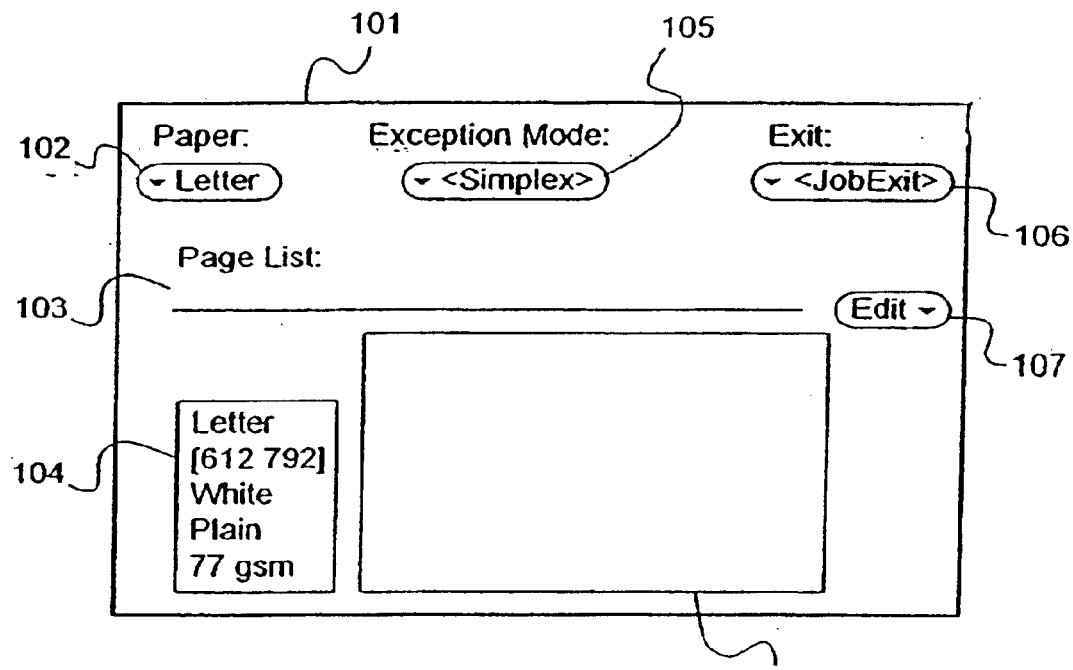
FIG. 5A is an illustrative screen associated with a user interface for making a print job request.

The screen 101 of FIG. 5A includes a medium indicator 102 (e.g., "Paper"), an exception mode 105, an output destination indicator 106 (e.g., "Exit"), and an editing indicator 107 (e.g., "Edit"). The operational parameters of the medium indicator 102, the exception mode 105, the output destination indicator 106, and the editing indicator 107 may be selected from pull-down menus. A user may reveal a pull-down menu by operation of the pointing device of the user interface 13 or otherwise. Alternatively, the medium indicator 102, the exception mode 105, the output destination indicator 106 and/or the editing indicator 107 may appear as text windows simultaneously displaying a selected list of operation parameters to the user in place of the pull-down menus.

In one example, the user may select a media for the pages to be printed by using the pull-down menu associated with the medium indicator 102. For the media selection indicated by media indicator 102 (e.g., "Paper"), the respective attributes are shown in a text box 104. In a preferred embodiment of the present invention, the user selects the media from a paper catalog. The paper catalog is a list whose entries correspond to every physical stock of media that is available to the user in the print shop and which may be loaded on the printer 18. The entry for a selected media in the paper catalog includes an identifier for the media and its respective attributes. Each print shop may require its own specific list corresponding to the stock used by the print shop. The print catalog is more fully described below.

The user can select a duplex (i.e., two-sided) or simplex (i.e., one-sided) copy using the pull-down menu 105 associated with the exception mode 105. The user can select an output destination 39 using the pull-down menu associated with the output destination indicator 106. The selected output destination may be referred to generally as a "<JobExit>". If a user designates a particular output destination as a "<JobExit>" for a print job, the particular output destination is regarded as the primary output destination for the print job. The selected output destination determines how a page is directed from an input source 38 to the output destination 39 of the printer 18. The options for pull-down menu of the output destination indicator 106 are: "<JobExit>", "out1", "out2", "out3", "out1+", "out2+", "M3+", where "out1" is an abbreviation for first output destination 35, "out2" is an abbreviation for the second output destination 36, and "out3" is an abbreviation for the third output destination 37.

The jam recovery assistance indicator is represented by the "+" sign, which is appended at a suffix to the foregoing abbreviations of the output destinations. The jam recovery assistance indicator denotes that the user wants jam recovery assistance for the identified pages and media The user types a list of page identifiers (e.g., page numbers) and the keyword "last" on the page identifier list 103 (e.g., "Page List") to apply the previously entered media selection 102, exception mode 105, and output destination 106 to the identified pages set forth on the page identifier list 103. After typing the page numbers into the page identifier list, the user may select an editing option to apply to the print job from an editing menu 107.

Figure 5B:
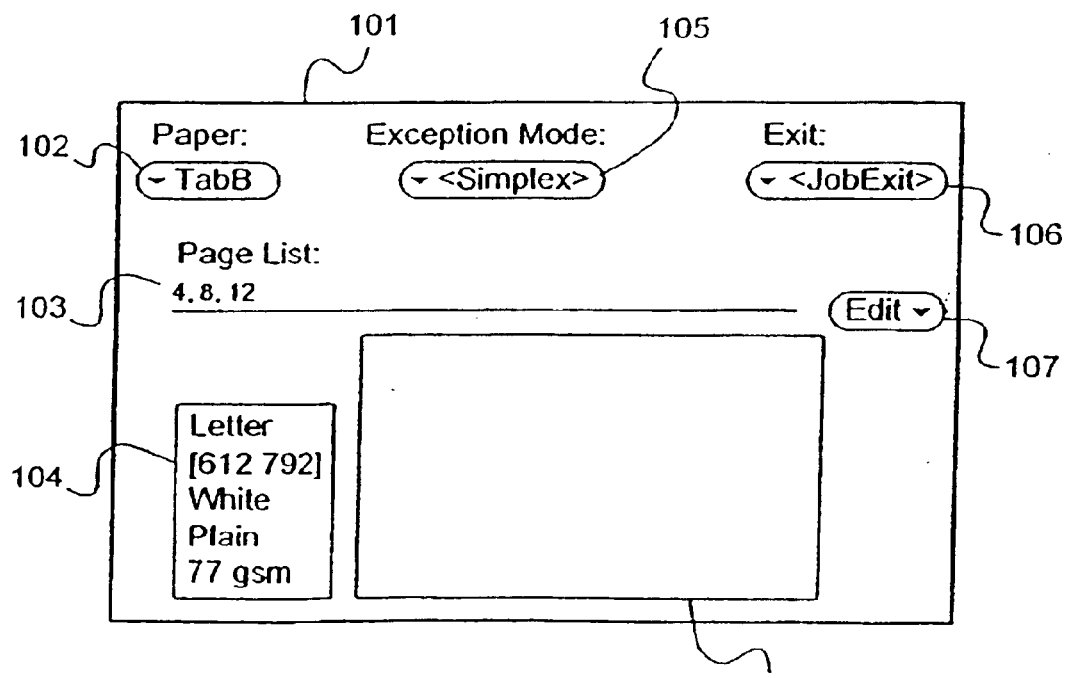
FIG. 5B is an illustrative screen demonstrating an early stage of a print job request.

FIG. 5B shows a screen as it would look after a user typed a list of page numbers via the user interface 13 on the page identifier list 103. This user also selected a new media called "TabB" by making a selection through a pull-down menu associated with the medium indicator 102. In a preferred embodiment, the user selects "TabB" from the paper catalog, as is more fully described below. The selected medium is described in the text box 104. Finally, the user selects the option "Insert" from a menu associated with the editing indicator 107.

Figure 5C:
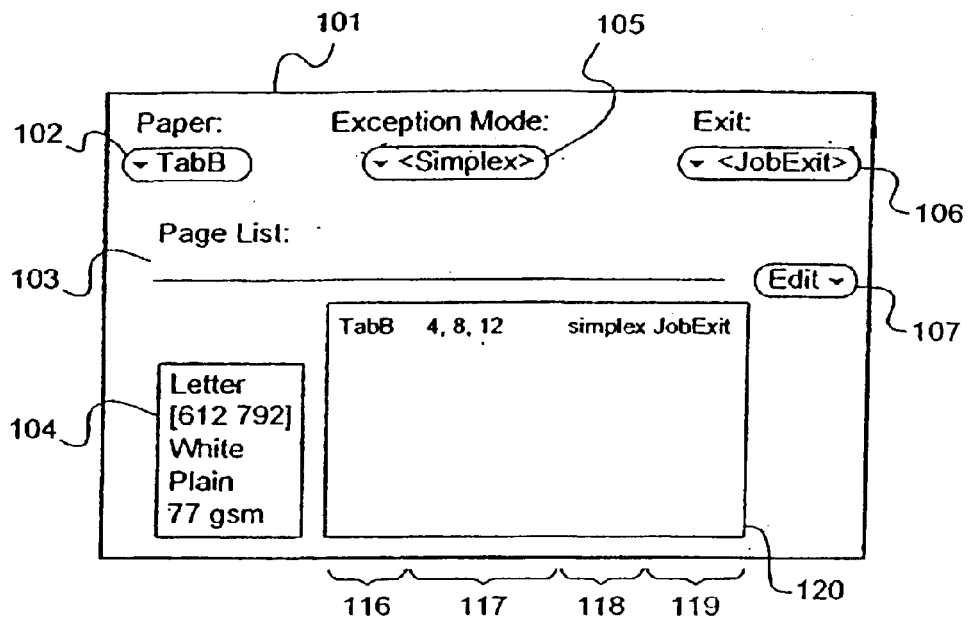
FIG. 5C is an illustrative screen showing a print job request in progress following the screen of FIG. 5B.

FIG. 5C shows the appearance of the screen after the procedure of FIG. 5B is executed. The text window 120 of FIG. 5C has four main columns (116, 117, 118, and 119). The leftmost column 116 represents the media indicator 102. The first intermediate column 117 represents a page identifier list 103. The second intermediate column 118 represents the exception mode 105. The rightmost column 119 represents the output destination indicator 106. The instructions in the text window 120 are in an acceptable format for interpretation by the CPU 17.

Figure 5D:
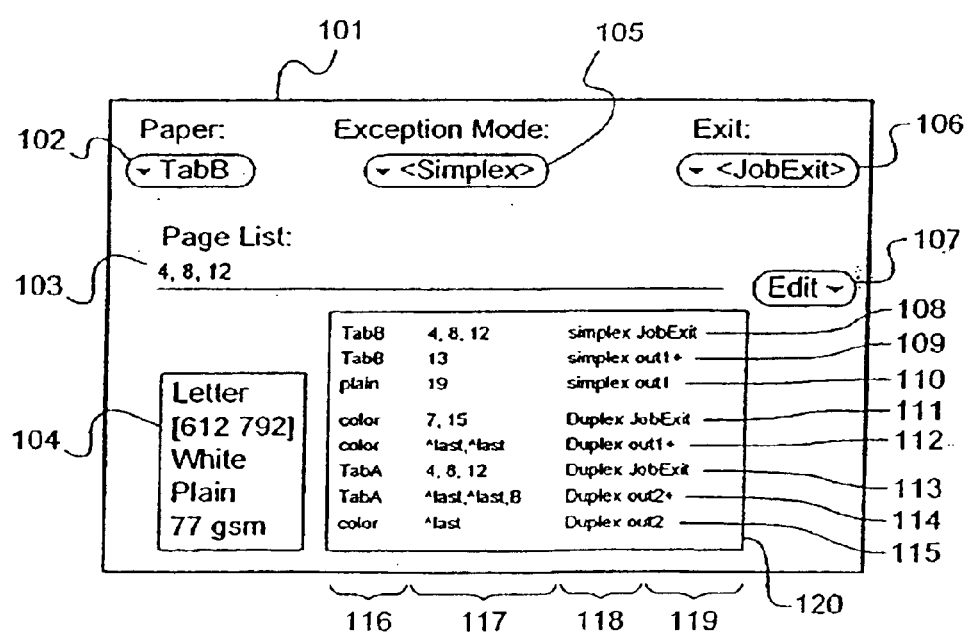
FIG. 5D is an illustrative screen showing a print job request in progress following the screen of FIG. 5C.

By repeating the entry of data into the user interface 13, the user may eventually populate the text window 120 as shown in FIG. 5D. The screen of FIG. 5D has a plurality of rows, which are labeled from 108 to 115, inclusive. The user types lines 113 and 114 in the text window 120 on the user interface 13 as shown in FIG. 5D. In the leftmost column, the media name is "TabA" of the text window 120 in FIG. 5D. The user wants to print all pages. The user also enables jam recovery messaging using the 'Y' appended to the desired output destination (e.g., "out2+") as shown in column 119.

In accordance with a preferred embodiment of the invention, the printing system 26 provides the user with graphical representations on the display 22 to assist the user in jam recovery. The jam recovery feature may be particularly important in printing systems where ordered media comprised of sheets having different physical characteristics, such as tabs, are used. In such an arrangement, the user sets up the print job by inserting the paper for the main body of the document to be printed in the first input source 32. Sets of the ordered media (at least one) are provided in the second input source 33. Each sheet of the ordered media comprises a plurality of different sheets to be inserted at specified locations in the body of the final document to be printed. If a jam occurs in the system, the operator needs to know where to recover to in the set of ordered media being processed at the time of the jam. That is, the operator needs to know if any of the sheets in the ordered media set need to be removed from the set.

In one embodiment of the present invention, the CPU 17 is programmed to determine the appropriate place to recover to in the supply of ordered media after a jam occurs in the printing system 26. That is, the CPU 17 determines which sheets, if any, in the set being used before the jam need to be removed. The CPU 17 generates a graphical representation assigned to the sheets and sends the graphical representation to display 22 of the user interface 13. The graphical representation indicates the appropriate starting point of the ordered media after a jam. The graphical representation may be, for example, a graphic with the completed pages highlighted to show the operator the recovery point. Alternatively, the system can display a graphic showing the particular sheet to recover to. The user then strips the sheets of ordered media that need to be discarded from the input source containing the ordered media.

Preferably, for ordered media consisting of tabs, the system displays a graphical representation on the display 22 of the correct tab to recover to. A more detailed disclosure of jam recovery for ordered media is provided in commonly assigned U.S. patent application Ser. No. 09/772,384, entitled "A Method And Apparatus Of Disposing Of Unused Ordered Media Within A Print Job," which is incorporated herein by reference.

In another feature of the invention, the scanner 12 may be used to scan an image of the set of ordered media. This may be particularly useful on ordered media that comprises photographs that may be hard to distinguish from one another. The scanned image would be saved to memory and when a jam occurred, the CPU 17 would determine the appropriate starting point for the ordered media. The image of the correct ordered media provided by the CPU 17 appear on the display 22. Preferably, this is implemented by generating a thumbnail of the ordered media on the screen and accenting or highlighting the correct thumbnail to inform the operator which image to recover to. Preferably, the CPU 17 is programmed to display an enlarged image of the correct sheet for better viewing by the operator. In one embodiment, the system can be programmed to store an image of the scanned in set of ordered media or the tabs necessary for a particular job. The stored data can then be used as part of preset job tickets. This feature maybe particularly useful for jobs that are ran on a periodic basis. For example, if a job is run once a month, the operator may store the scanned images once and store the images as a job ticket and then in the following months the operator would invoke the job ticket. A more detailed disclosure of job tickets is provided in commonly assigned U.S. patent application Ser. No. 09/572, 341, entitled "System And Method For Implementing Compound Documents In A Production Printing Workflow," which is incorporated herein by reference.

In accordance with FIG. 5D, the user could type line 110. Unlike the previous examples, the user does not enable jam recovery messages in line 110. Line 110 allows page nineteen from the job to be sent to the first output destination 35. The user may want part of the print job, such as page nineteen, handled differently by the printing system 26. For example, page nineteen might be a printed instruction sheet for the operator describing what to do with the rest of the printed output. It could also be a status page.

The user could type lines 111, 112 and 115. The instructions of line 111 in the text window 120 would instruct the printing system 26 to print on "color" media for pages seven and fifteen. The instructions of line 112 instruct the printing system 26 to send two unprinted sheets of "color" media would be sent to the first output destination 35 at the end of each set. The instructions of line 115 instruct the printing system to send one imprinted sheet of "color" media to the second output destination 36.

It should be understood, however, that the screens 101 of FIG. 5A to FIG. 5B are for illustrative purposes only and that the user interface 13 of the present invention is not restricted to the screens depicted in FIG. 5A to FIG. 5D. The user interface 13 may display other arrangements of the screens, which may contain more or fewer indicators. Additionally, the user interface 13 may present multiple screens in place of the single screen as illustrated in FIG. 5A to FIG. 5B. The multiple screens may enable the user to control various aspects of the printing system 26.

FIG. 6A and FIG. 6B together show an example of an output set 91 which could be generated by the printing system 26. This output set 91 would be generated from thirteen input pages in one or more input sources 38. Here, the print job has already specified the "<JobExit>" to be the second output destination 36 via the user interface 13. The first input source 32 contains paper or another media with two tabs The second input source 33 contains "letter" media, such as letter size paper. To produce the output set of FIG. 6A and FIG. 6B, the user types lines 108 and 109 of FIG. 5D of the text window 120 into the user interface 13. The media name for the paper with two tabs is "TabB" as shown in column 116 of the text window 120 in FIG. 5D. The user wants to print all pages of the output set with "TabB" for pages 4, 8, and 12. The user also enables jam recovery messaging for page 13 using the "+" appended to the desired output destination as shown in column 119.

FIG. 6A and FIG. 6B shows one output set 91 of a print job consistent with the entry of the input instructions into the text window 120 of the user interface 13. The pages in the group of FIG. 6A are sent to the second output destination 36. The pages of the group of FIG. 6A are actually stacked on top of each other in the second output destination 36. FIG. 6A shows the letter sheets and the "TabB" media sheets next to each other for purposes of clearly identifying the "TabB" media sheets.

First, the CPU 17 directs pages one, two, and, three, collectively designated group 92, from the second input source 33 to the second output destination 36. The group 92 of pages one, two, and three represent "letter" media or printed-on letter media. Second, the CPU 17 directs input page four, designated 93, from the first input source 32 to the second output destination 36. Page four 93 represents the first type of "TabB" media or printed-on "TabB" media. Third, the CPU 17 directs pages five, six and seven, collectively designated 94, from the second input source 33 to the second output destination 36. The fifth, sixth, and seventh pages represent "letter" media or printed on letter media. Fourth, the CPU 17 directs input page eight, designated 95, from the first input source 32 to the second output destination 36. The eighth page is printed on the second type of "TabB" media. Fifth, pages nine, ten and eleven, designated collectively as 96, are printed on "letter" media from the second input source 33 and directed to the second output destination 36. Sixth, input page twelve 97 is printed on the second "TabB" media and directed from the first input source 32 and directed to the second output destination 36. Finally, the thirteenth page is removed from the first input source 32 and sent to the one of output destinations 35 or 36.

FIG. 6C provides a table of a media exit pattern for the output set of FIG. 6A and FIG. 6B. The table specifies the output set in terms of a page identifier, a printing indicator, and an output destination, which may be processed by the CPU 17.

FIG. 7A and FIG. 7B illustrate a second example of an output set which could be generated by the printing system 26 of FIG. 1. The output set of FIG. 7A and FIG. 7B may be generated from fourteen input pages in the input sources 38. Here, for the print job in FIG. 7A and FIG. 7B, a user has already requested the "<JobExit>" to be the second output destination 36 via the user interface. The first input source 32 contains a five-part tab media. The second input source 33 contains "letter" media, such as letter-size paper.

FIG. 7A and FIG. 7B collectively show one output set 81 of a print job. The pages of FIG. 7A are sent to the "<JobExit>" which is designated the second output destination 36 for the print job via the user interface 13. Pages of FIG. 7A are actually stacked on top of each other in the second output destination 36. FIG. 7A show them next to each other for purposes of clearly identifying the "TabA" media sheets.

The first pages delivered are pages one, two and three 82, which are collectively designated as group 82. Group 82 are printed on "letter" media. Input page four, designated 83, is printed on the first "TabA" media. Pages five, six and seven, designated group 84, are printed on "letter" media. Before printing page 8, the system sends an imprinted "TabA"

media 88 to the first output destination 35 as indicated in FIG. 7B. Input page eight, designated 85, is printed on the third "TabA" media 85. Pages nine, ten and eleven, collectively designated 86, are printed on "letter" media. Page twelve, designated 87, is printed on the fifth "TabA" media. Before printing page twelve 87, the system sends an imprinted "TabA" media 89 to the first output destination 35.

The printing system 26 may build a page feed command for the printer 18 using a special balanced media exit pattern consistent with the table of FIG. 7C. The user enables the special balanced media exit pattern by specifying the term "B" in the page list 103 as shown in line 114 of the text window 120 in column 117 of FIG. 5D. A balanced media exit pattern refers to a media exit pattern that distributes media for a print job in a generally equal or even-handed manner between or among different output destinations 39.

In FIG. 7D, a chart shows a media exit pattern using an unbalanced media exit pattern. For this example the media repeats for pairs of successive sheets, but the job request in the chart repeats every four sheets. In other respects the media exit pattern of FIG. 7D is similar to the media pattern exit of FIG. 7C.

As described above, the user may select a media for the pages to be printed using the pull-down menu associated with the medium indicator 102 of FIG. 5. In a presently preferred embodiment, the user selects the media from a paper catalog. The paper catalog is a list whose entries correspond to every physical stock of media that is available to the user in the print shop. The entry for a selected media in the paper catalog includes an identifier for the media, such as a paper name, and its respective attributes. Each print shop may require its own specific list corresponding to all stock available in the print shop.

An advantage of using the paper catalog is that the attributes of each media are stored in the entries in the paper catalog and do not need to be entered each time a media is selected for printing. Some printing systems require that when the user is creating the page list 103 for each media in the print job, the user must define each attribute of the media separately, i.e., enter each of the size, color, weight, type and/or mode separately. In contrast, by having the attributes associated with a name for the media in the paper catalog, the user need only make a single selection from the paper catalog to define media rather than making a selection for each attribute of the media.

The print shop changes the paper catalogue when a new media is added to the paper stock. Typically, the print shop uses a utility program to edit the paper catalog, enter a name for the new media, and enter the attributes of the new media. The utility program stores the entry for the new media in the paper catalog. Also, should the print shop discontinue stocking a media or substitute a media for another with different physical properties, the utility program may delete the entry for the media from the paper catalog or provide a dialog for changing the attributes of the media entry to conform to the different physical properties.

In one presently preferred embodiment, the user interface presents the paper catalog to the user as a pull-down menu associated with the medium indicator 102. The pull-down menu may include the names of all media in the paper catalog. When the user selects the media from the pull-down menu, the medium indicator 102 displays the name of the selected media and the text box 104 displays the attributes of the named media that have been stored in entry for the media in the paper catalog.

Often, however, the paper catalog may contain entries for many types of media available in the print shop. In a professional print shop, the number of different types of available media may exceed one hundred. In this case, the use of the pull-down menu would be cumbersome. In another presently preferred embodiment, the print catalog is presented as another screen on the user interface.

Figure 8:
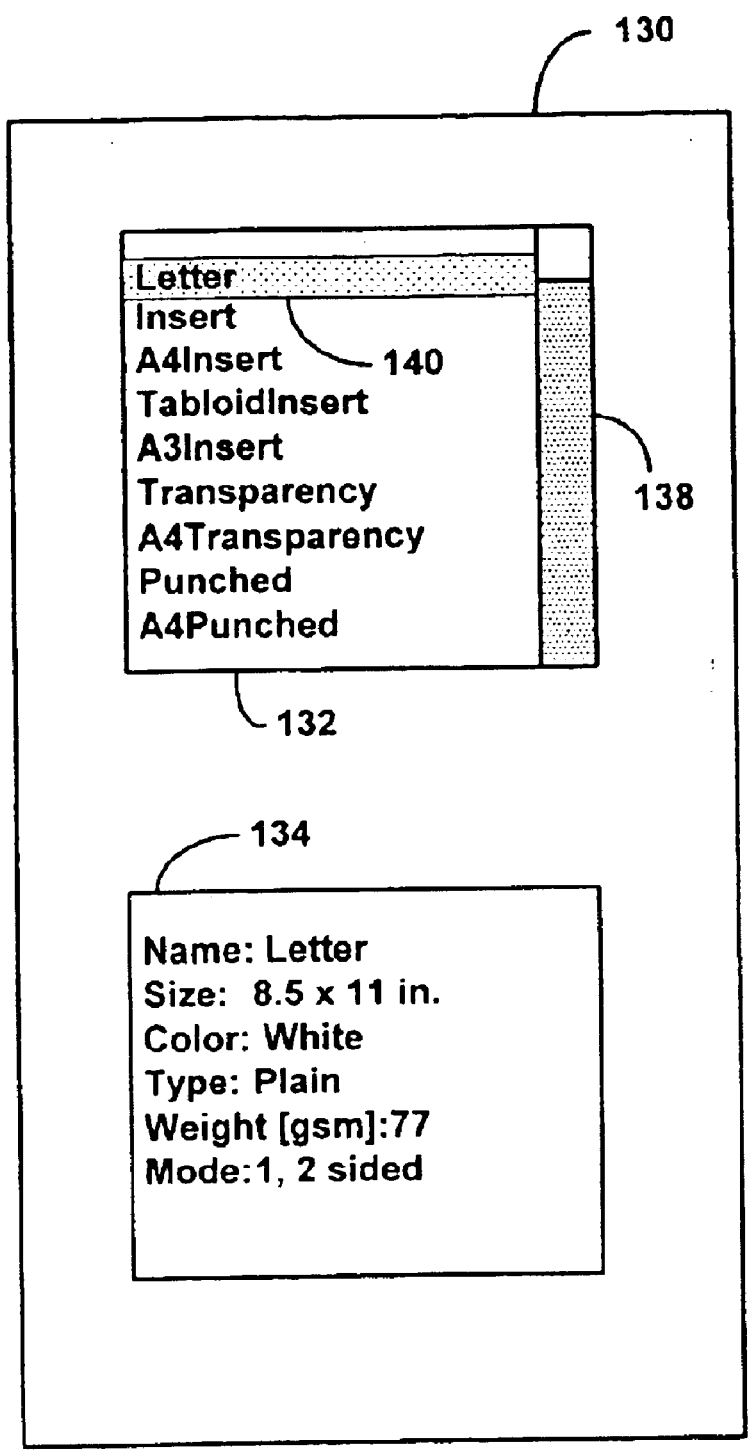
FIG. 8 is an illustrative screen associated with a user interface for showing a paper catalog.

FIG. 8 is an illustrative screen 130 associated with a user interface 13 for showing a paper catalog. The user interface 13 may display the paper catalog screen 130 on the printing system 26 or the remote processing system 20. The paper catalog screen 130 includes a text window 132, which displays a selection of names of the media stored in the paper catalog. The text window 132 may include a scroll bar 138 to navigate through the list of media names in the paper catalog should the available media in the paper catalog be too numerous to display simultaneously. Using the keyboard or pointing device of the user interface 13, the user may select a media entry in the paper catalog by scrolling with the scroll bar 138 until the desired media is displayed in the text window 132, at which time the user selects the media by a keystroke or operation of the pointing device, such as a single click of a mouse, and the selected entry appears as a highlighted entry 140 on the user interface. The paper catalog screen 130 may also include a text box 134 that displays the attributes of the highlighted media entry 140.

It should be understood however, that displaying the paper catalog in a text window 132 is for illustrative purposes and the present invention is not restricted to the embodiment illustrated in FIG. 8. For example, user interface 13 may display the paper catalog as a collection of icons, familiar to those of ordinary skill in the art. Each icon corresponds to media in the paper catalog. The icons may be grouped in an expandable tree and root configuration or independently selectable from a scrollable window as is familiar to those of ordinary skill in the art.

In one presently preferred embodiment, by operating on the highlighted entry 140 in paper catalog screen 130 through the user interface 13, e.g., by double clicking with the mouse or depressing the "Enter" key on the keyboard, the user may enable use of the paper catalog entry in the screen 101 of FIG. 5. For example, double clicking on the highlighted entry 140 on the paper catalog screen 130 may include the paper catalog entry in the medium indicator 102 of the screen 101 of FIG. 5. In contrast to having the complete paper catalog available to the user through the medium indicator 102, the medium indicator 102 may display the media that have been selected from the paper catalog screen 130 by the method described above.

In such a manner, the user may construct a reduced paper catalog that lists the required media for the print job and excludes media that are not required for the print job. The reduced paper catalog is typically much smaller than the full paper catalog and facilitates associating the pages of the print job with media because searching the reduced paper catalog for a particular media is more efficient than searching the complete paper catalog.

Figure 9:
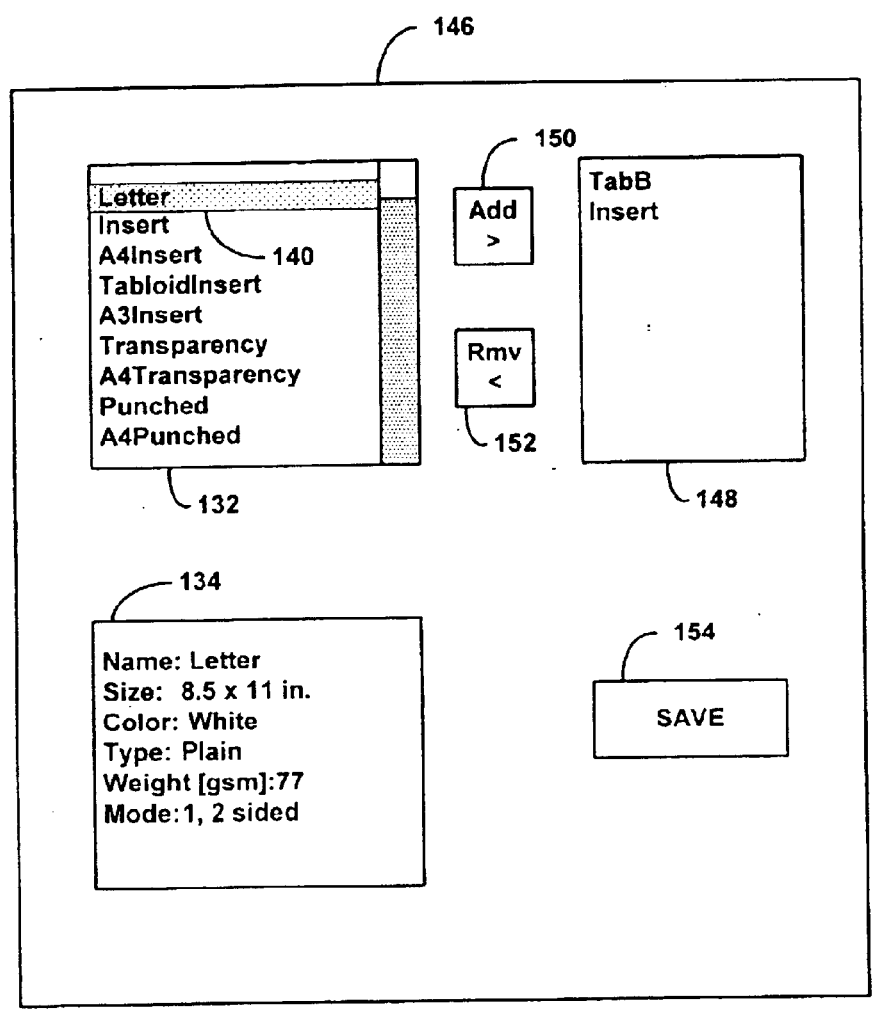
FIG. 9 is another illustrative screen associated with a user interface for showing a paper catalog.

In another presently preferred embodiment, the paper catalog screen includes another text window containing entries for the reduced paper catalog. FIG. 9 is another illustrative screen 146 associated with a user interface 13 for showing a paper catalog. The paper catalog screen 146 includes a text window 132, which displays a selection of names of the media stored in the paper catalog. The paper catalog screen 146 also includes a second text window 148 that displays the names of the media associated with the reduced paper catalog. In the illustrative example of FIG. 9, the reduced paper catalog includes two media entries corresponding to "TabB" and "Insert" media.

Selecting a media entry in the paper catalog and displaying the entry as a highlighted entry 140 in the text window 132 for the complete paper catalog, the user may add the selected media to the reduced paper catalog by operating on the "Add" button 150 provided by the user interface.

Consequently, the highlighted entry 140 in the complete paper catalog also appears in the second text window 148 for the reduced paper catalog associated with the print job. Removing a media from the reduced paper catalog may include the steps of highlighting the entry to be removed in the second text window 148 and operating on the "Remove" button 152 provided by the user interface 13. In this manner, the user may construct a reduced paper catalog from the complete paper catalog.

The user may save the reduced paper catalogue by operating on the "Save" button 154 in the paper catalog screen 146 of the user interface 13. The saved reduced paper catalog may be associated with the print job by creating a header for the print job that instructs the printing system 26 regarding which media are used during the print run. Associating the reduced print catalog with the print job may alert the user to load a particular media into the printer 18 for completion of the print job. Also, by saving the reduced paper catalog with the print job, later printings of the print do not require the operator to reconstruct the reduced paper catalog from the complete paper catalog.

In yet another preferred embodiment, by selecting a media entry in the paper catalog and displaying the entry as a highlighted entry 140 in the text window 132 for the complete paper catalog, the user may add the selected media to the reduced paper catalog in the second text window 148 by dragging the highlighted entry 140 from the text window 132 and dropping it in the second text window 148. Dragging and dropping are operations in user interfaces 13 with pointing devices that are familiar to those of ordinary skill in the art.

It should be understood however, that displaying the paper catalog in the text window 132 and second text window 148 are for illustrative purposes and the present invention is not restricted to the embodiment illustrated in FIG. 9. For example, user interface 13 may display the complete paper catalog and/or the reduced paper catalog as a collection of icons in respective windows as is familiar to those of ordinary skill in the art. Each icon corresponds to media in the paper catalogs. The icons may be grouped in an expandable tree and root configuration or independently selectable from a scrollable window as is also familiar to those of ordinary skill in the art.

In a further preferred embodiment, the user may drag a highlighted entry for media from a text window 132 containing the paper catalog in such screens as illustrated in FIG. 8 or FIG. 9 and drop the dragged entry in a screen 101 such as that illustrated in FIG. 5. Dropping the highlighted entry in the screen 101 may provide an entry for the media in a pull-down menu associated with the medium indicator 102.

When using ordered media within a print job, there may be instances where it is necessary to separate or dispose of unused portions or sheets of the ordered media as in FIG. 6B and FIG. 7B. Separating the unused portions of the ordered media during the print job may slow down the completion of the print job. This may lead to inefficient use of printing system 26 when the print shop has many print jobs to run on the printing system 26. Pre-selecting the required ordered media, however, may provide more efficient use of the printing system 26 as it does not need to discard the unwanted ordered media during the print runs. For example, during times of light usage of the printing system 26, such as at night, the user may instruct the printing system 26 to pre-select the ordered media to be used in the next day's print jobs. Alternatively, the printing system 26 may include a dedicated device whose sole function is to pre-select ordered media.

FIG. 10 is a flow chart for a preferred method 160 of pre-selecting ordered media in a printing system 26. In step S22, the user selects an ordered media from a paper catalog through an interface 13 on the printing system 26. An ordered media set includes multiple sheets or pages having different physical characteristics. For example, the user may select "TabB" from the paper catalog in the pull-down menu associated with the medium indicator 102. Alternatively, the user may select the ordered media from a text window 132 for the complete paper catalog in a paper catalog screen 130, 146, and/or from the second text window 148 for the reduced paper catalog. The user may first create the reduced paper catalog from the complete paper catalog as described above, or may drag and drop the entry for the selected ordered media into the screen 101 on the user interface 13 of the printing system 26 or the remote processing system 20.

In step S24 of the method 160, the user stores at least one set of the ordered media in an input source 38, such as a print tray or an inserter.

In step S26 of the method 160, through the interface 13 on the printing system 26 or the remote processing system 20, the user pre-selects a first part of the ordered media set to be used in a print job and a second unwanted part of the ordered media set to be discarded.

In step S28 of the method 160, the user configures the printing system 26 to send the first part of the ordered media set directly to a first job output 39 and the second part of the ordered media set directly to a second job output 39 in response to input on the interface 13. For example, the user interface 13 may include a "pre-select ordered media" entry in a pull-down menu associated with the exception mode 105. In combination with the output destination indicator 106 of the user interface 13, the user may configure only that portion of the sets of ordered media required by the print job to exit in the first job output 39, such as a stacker, while the unwanted portion of the sets of ordered media exit in the second job output 39, such as the top exit.

The printing system 26 sends the ordered media directly to the job outputs 39 without receiving an image from the print engine. For example, if the input source 38 is an inserter, the ordered media typically do not pass through the print engine between the input source 38 and the job outputs 39.

FIG. 11 is a flow diagram illustrating a presently preferred method 170. for pre-selecting ordered media in a printing system 26. In step S32 of the method 170, the printing system 26 associates the ordered media with an entry in a paper catalog in response to an input on an interface 13. For example, the paper catalog entries may be stored in a memory and the user interface 13 displays the paper catalog entries to the user. In response to the user identifying a name for desired ordered media amongst the displayed paper catalog entries and highlighting, or dragging and dropping, the name of the ordered media as described above.

In step S34 of the method 170, the printing system 26 pre-selects a first part of an ordered media set to be used in a print job in response to another input on the interface 13. For example, using the screen 101 of the user interface 13, the user may instruct the printing system 26 to select only the first three tabs of a five tab set for use in the print job depicted in FIG. 7A.

In step S36 of the method 170, the printing system 26 determines a second unwanted part of the ordered media set to be discarded. For example, in response to the input at step S34 and knowledge of the size of the ordered media set, the CPU 17 of the printing system 26 may calculate that the two last tabs of FIG. 7B should be discarded for the print job depicted in FIG. 7A.

In step S38 of the method 170, the printing system 26 configured itself to send the first part of the ordered media set directly to a first job output 39 and the second part of the ordered media set directly to a second job output 39. For example, the printing system 26, through the user interface 13, receives instructions from the user to send the first three tabs of the five tab set to a stacker 39 and the unwanted last two tabs to the top exit.

The foregoing detailed description is merely illustrative of several embodiments of the invention. Variations of the described embodiments may be encompassed within the purview of the claims. The steps of the flow diagrams may be taken in sequences other than those described, and more or fewer elements or components may be used in the block diagrams. Accordingly, any description of the embodiments in the specification should be used for general guidance, rather than to unduly restrict any broader descriptions of the elements in the following claims.

We claim:

1. A system for pre-selecting ordered media in a printing system, comprising:
   (a) an input source to store at least one set of the ordered media;
   (b) a user interface having an input device to select the ordered media from a paper catalog, and to pre-select a first part of the ordered media set to be used in a print job and a second unwanted part of the ordered media set to be discarded;
   (c) a first job output;
   (d) a second job output; and
   (e) a central processing unit configured to send the first part of the ordered media set directly to the first job output and the second part of the ordered media set directly to the second job output.

2. The system of claim 1 wherein the ordered media comprise tabs.

3. The system of claim 1 wherein the input source is an inserter.

4. The system of claim 1 wherein the input source is a print tray.

5. A method of pre-selecting ordered media in a printing system, the method comprising the steps of:
   (a) associating the ordered media with an entry in a paper catalog in response to an input on an interface;
   (b) pre-selecting a first part of a set of the ordered media to be used in a print job in response to another input on the interface;
   (c) determining a second unwanted part of the ordered media set to be discarded; and
   (d) configuring the printing system to send the first part of the ordered media set directly to a first job output and the second part of the ordered media set directly to a second job output.

6. A computer readable medium, having stored therein instructions for causing a central processing unit to execute the method of claim 5.

7. A method of pre-selecting ordered media in a printing system, the method comprising the steps of:
   (a) selecting the ordered media from a paper catalog through an interface on the printing system, wherein the ordered media comprises a plurality of sheets having different physical characteristics;
   (b) storing at least one set of the ordered media in an input source;
   (c) pre-selecting through an interface on the printing system a first part of the ordered media set to be used in a print job and a second unwanted part of the ordered media set to be discarded; and
   (d) configuring the printing system to send the first part of the ordered media set directly to a first job output and the second part of the ordered media set directly to a second job output in response to input on the interface.

8. The method of claim 7 wherein the ordered media comprise tabs.

9. The method of claim 7 wherein the input source is an inserter.

10. The method of claim 7 wherein the input source is a print tray.

11. A system for pre-selecting ordered media in a printing system, comprising:
    (a) means for associating the ordered media with an entry in a paper catalog in response to an input on an interface;
    (b) means for pre-selecting a first part of a set of the ordered media to be used in a print job in response to another input on the interface;
    (c) means for determining a second unwanted part of the ordered media set to be discarded; and
    (d) means for configuring the printing system to send the first part of the ordered media set directly to a first job output and the second part of the ordered media set directly to a second job output.

* * * * *